United States Patent
[15] 3,678,419
[45] July 18, 1972

Boulin et al.

[54] THREE-TERMINAL MODULAR ELECTRIC FILTERS

[72] Inventors: Jacques R. Boulin, Paris; Alexis Nepomiastchy, Bagneux, both of France

[73] Assignee: Societe Anonyme de Telecommunications, Paris, France

[22] Filed: Dec. 28, 1970

[21] Appl. No.: 101,691

[30] Foreign Application Priority Data

Aug. 4, 1970 France ....................7028785

[52] U.S. Cl. ....................333/70 S, 174/52 PE, 317/101 R
[51] Int. Cl. ....................H03h 7/10, H05k 1/18
[58] Field of Search ....................333/70 S, 79, 84 M; 178/46; 317/101, 242; 174/52 PE

[56] References Cited

UNITED STATES PATENTS 3,447,104 5/1969 Schor....................333/79
3,521,200 7/1970 Matushima....................333/79
3,456,215 7/1969 Denes....................333/79
3,256,499 6/1966 Khouri....................333/79
3,546,638 12/1970 Park....................333/79

*Primary Examiner*—Herman Karl Saalbach
*Assistant Examiner*—Marvin Nussbaum
*Attorney*—Abraham A. Saffitz

[57] ABSTRACT

An improved modular construction of a three-terminal electric filter element comprising an adjustable inductance and a plurality of fixed capacitors, comprising an insulating base bearing output pins and assembled to a metal casing, wherein the capacitors are fixed mechanically and connected electrically to a connecting plate which is made of an insulating material and at least one of whose surfaces bears a circuit of electric connections in the form of a printed circuit for connecting the members making up the modular element, and wherein the pins extend through the inside of the casing to engage in holes with which the connecting plate is formed at selected points of the printed circuit.

2 Claims, 2 Drawing Figures

INVENTORS:
Jacques R. BOULIN
and Alexis NEPOMIASTCHY
By Abraham A Saffitz
ATTORNEY INVENTORS:
Jacques R. BOULIN
and Alexis NEPOMIASTCHY
By Abraham A. Saffitz
ATTORNEY

THREE-TERMINAL MODULAR ELECTRIC FILTERS

This invention relates to a novel modular construction of tripolar electric filter elements (i.e., elements having three terminals), comprising a variable inductance having a ferrite core and one or more fixed capacitors.

Modular constructions of electric filters are known, more particularly that disclosed in the U.S. Pat. application, Ser. No. 23,797 filed by the present Applicants jointly with Marcel R. BERTIN, on Mar. 30, 1970 for "Modular elements for electrical filters and filters employing the same," now U.S. Pat. No. 3,636,481, issued Jan. 18, 1972.

According to the features disclosed in the last-mentioned patent application, the various components of an electric filter are conveniently associated in two-three-or four-terminal elements each comprising a variable inductance and one or more fixed capacitors assembled to form a mechanically constructed unit, or module or modular element which is given a final individual adjustment such that a filter, produced by the assembly of a number of modular elements of the kind specified, behaves as required without needing any further adjustment once the elements have been interconnected.

Also according to the above-mentioned patent application, the electronic components of the modular element are grouped in a casing of well-defined dimensions to ensure magnetic and electric shielding, water-tightness and air-tightness. In the casing, the electric connections between the members forming the modular element are made by the direct manual assembly, preferably by welding, of the connections of such members, namely : three insulated pins in the base forming the outputs of the modular element ; four lugs forming the connections of the capacitors ; four tags for attaching the leads to the inductance.

Inevitably this procedure means that the positioning of the members and their electric connections is relatively complex, since the members making up the modular element are not of simple geometrical shape, and moreover the way in which the connections are assembled differs with the electric layout of each kind of modular element.

Furthermore, some very complex layouts require extra connecting members such as a plate comprising connections connecting the pins diagonally, insulating sheaths enabling a relay thimble to be provided concentric of one of the pins, and an insulating plate.

Although this represents substantial progress, clearly the mass production of modular elements of the kind specified results in some complication of manual assembly or considerable complication of automatic assembly machines, since whether the assembly is manual or automatic, the various operations must be performed differently in dependence on the kinds of modular elements to be produced.

This invention relates to improvements in the technology of modular elements of the kind specified, whereby their assembly can be readily automated. The modular elements comprising the improvements are characterized in that the capacitors are fixed mechanically and connected electrically to a plate or connecting plate made of a suitable insulating material and one or two of whose surfaces bear a circuit of electric connections in the form of a printed circuit, such circuit being for the connection of the members making up the modular element.

The inductance, which is formed by a coil made on a pot-shaped ferrite core, is disposed immediately above an insulating base bearing the pins of the modular element and conventionally regarded as its lower portion, while the capacitors and the connecting plate are above the inductance.

The connecting plate can be made of ceramics, mica, or any other printed circuit material, on which the circuit of electric connections is produced by known methods, such as the deposition of conductive layers, or the chemical etching of a copper deposit.

The capacitors - one or two in the example described - are placed on the two surfaces of the plate and connected thereto by welding. The capacitors are assembled simply by stacking their plates, for instance, mica sheets if the capacitor is a mica capacitor, and the capacitors carry no further connecting member, such as connecting wires or flanges.

If mica is the particular material of which the connecting plate is made, the plate can be the end sheet forming an integral part of a capacitor and protecting the component.

The modular element output pins (extending through the element over the majority of its height), the connections to the inductance and the connections to the capacitors are connected to the connecting plate by welding. The connections to the inductance, and also the modular element output pins forming part of the base, engage in special holes or recesses with which the connecting plate is formed, for electrical connection purposes.

The following description of an embodiment of a modular element according to the invention will be more clearly understood with reference to the accompanying drawings, wherein.

Figure 1:
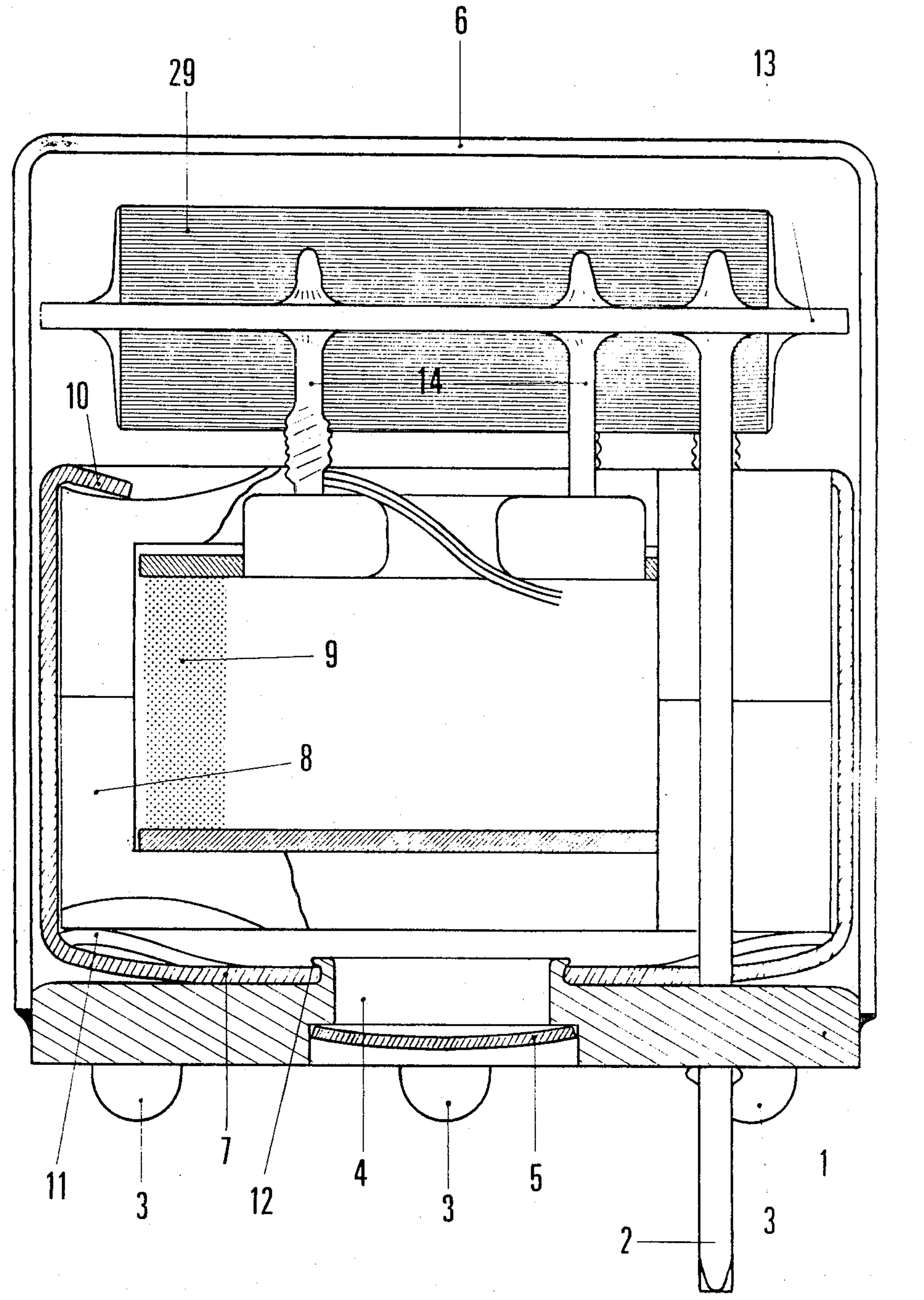
FIG. 1 is a vertical section through a modular element according to the invention.

FIG. 1 shows the general construction of the modular element produced by the method disclosed in the afore-mentioned U.S. Patent Application. Referring to FIG. 1, a metal base 1 having insulated outputs comprises three output pins (only one 2 is shown in FIG. 1), spacing studs 3, 3, 3 adapted to limit by abutment the engagement of the pins in matching holes in a printed circuit when the modular element is put in place, and a central aperture 4 which is closed by a disc 5, eventually after gas filling of the modular element. Most prior art modular elements had such an aperture for gas filling in the upper portion of the casing 6. However, since the latter was rather thin it was difficult to ensure sealing-tightness between the casing and the disc closing the aperture. In the modular element according to the invention, therefore, the aperture is in the base 1, which is thicker than the casing 6. One of the features of the disc disposed in the base, and not in the thin casing, is that the disc is thick enough to be a force-fit in the base, which is itself thick, thus ensuring adequate sealing-tightness without welding or glueing.

The inside of the enclosure formed by the base 1, the disc 5 and the casing 6 contains, starting from the lower portion, a spring 7 for retaining a ferrite pot containing a coil 9. The spring 7 performs the double function of retaining the ferrite pot 8 clamped between its upper lugs 10 and lower resilient tongues 11, and also locates the ferrite pot resiliently on the base 1, the spring 7 being fixed in a notch 12 in the base 1. The ferrite pot 8 is of rectangular section, so that modular element connecting pins, as 2, and connecting pins, as 14, of the inductance coil 9 can extend between the casing and the pot through the gaps left at its sides. The ends of the seven pins, three modular element output pins (as 2) and four inductance pins (as 14) engage in seven holes with which the connecting plate 13 is formed.

Figure 2:
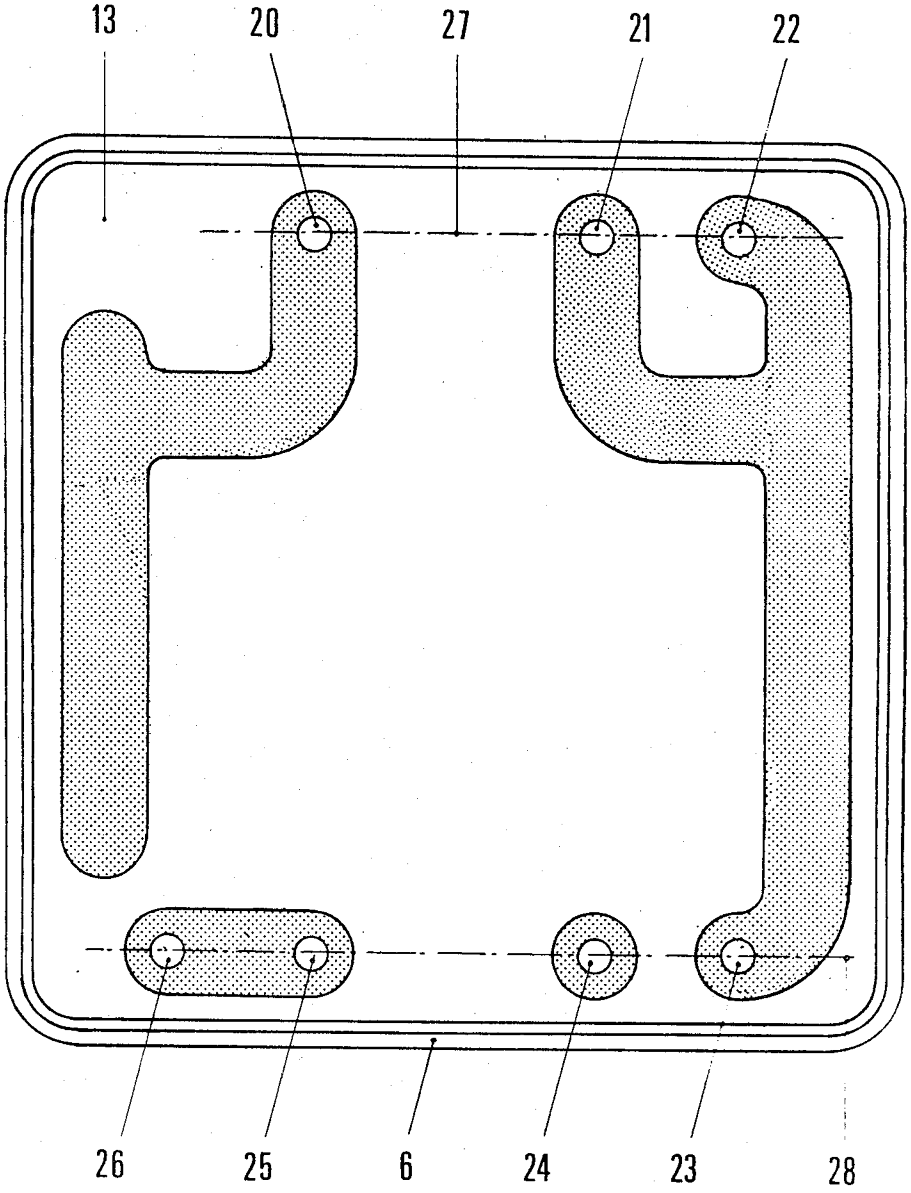
FIG. 2 is a front view of the connecting plate included in the modular element.

FIG. 2 is a front view of the connecting plate showing four holes 20, 21, 24, 25 receiving the inductance connections, and three holes 22, 23, 26 receiving the output connections of the three-terminal filter-element, the holes being aligned along two parallel straight lines 27, 28. The shaded portions of FIG. 2 show by way of non-limitative example a printed circuit as required for the construction of this particular type of element. Clearly, any other kind of three-terminal filter can be produced by suitably designing the printed circuit on the connecting plate 13. Also stacked on the connecting plate are plates 29 (FIG. 1) forming the capacitor or capacitors forming part of the filter element. The connecting plate can comprise a capacitor on each surface. If the element to be produced comprises three or four capacitors, two connecting plates, as 13, can be superimposed. In this way all possible kinds of three-terminal elements can be produced.

The printed circuit can be made on one or both surfaces of the connecting plate, depending on manufacturing facilities and specific circuits required. If the connecting plate has the printed circuit on both surfaces, the holes 20 – 26 can be metallized or not.

The construction of filters in the form of modular elements according to the invention has many advantages, the main ones being : the mechanical assembly and electric connection of the constituent members are strictly identical for all kinds of three-terminal filter elements, whatever the configuration of their electric connection system may be ; assembly is extremely simple and members of very accurate geometrical dimensions and simple shapes can be used, so that assembly can be automated at low cost; the electric connection is made by welding spots lying in the same plane (the plane of the connecting plate), thus greatly facilitating pool or surge welding.

What we claim is:

1. A three-terminal filter modular element, in combination with a variable inductance and one or more fixed capacitors in a single mechanically constructed unit, said modular element comprising a metal casing, an insulating base bearing output pins which is assembled to said metal casing, a connecting plate, said capacitors being mechanically fixed and electrically connected to said connecting plate which is made of an insulating material and at least one surface of said connecting plate bearing a printed circuit for connecting the electrical members making up said modular elements, said pins extending through the inside of said casing to engage in holes with which said connecting plate is formed at selected points of said printed circuit, and said variable inductance comprising a coil and a magnetic ferrite pot of rectangular cross-section disposed in a square section of the modular element casing and allowing the output pins to extend freely through the gaps between the casing and the pot to the connecting plate.

2. A three-terminal filter modular element as set forth in claim 1, wherein an adjusting aperture is formed in the base to enable the ferrite pot to be adjusted, the aperture being closed after adjustment by a sealing-tight disc which can be applied.

* * * * *